United States Patent
Roczynski et al.

[11] Patent Number: 6,050,318
[45] Date of Patent: Apr. 18, 2000

[54] APPARATUS AND METHOD FOR PROTECTIVE LAYER APPLICATION

[75] Inventors: Robert Roczynski, Cheshire; John Suchecki, Northford, both of Conn.

[73] Assignee: Record Products of America, Inc., Hamden, Conn.

[21] Appl. No.: 09/209,950

[22] Filed: Dec. 11, 1998

[51] Int. Cl.⁷ .............................. B32B 31/18; B32B 31/20
[52] U.S. Cl. .................... 156/522; 156/267; 156/576; 156/583.3
[58] Field of Search ................................. 156/285, 306.3, 156/308.2, 382, 583.3, 60, 105, 526, 527, 267, 522, 576; 369/283, 286; 428/64.4, 65.5; 100/211; 83/267

[56] References Cited

U.S. PATENT DOCUMENTS

| | | | |
|---|---|---|---|
| 4,114,213 | 9/1978 | Beernaerts et al. | 156/285 X |
| 4,193,341 | 3/1980 | Clements et al. | 100/211 X |
| 4,872,325 | 10/1989 | Moser et al. | 100/211 X |
| 5,078,820 | 1/1992 | Hamamura et al. | 100/211 X |
| 5,494,546 | 2/1996 | Horvath | 156/102 |
| 5,730,827 | 3/1998 | Sewell | 156/269 |

FOREIGN PATENT DOCUMENTS

| | | | |
|---|---|---|---|
| 3644593 A1 | 7/1988 | Germany | B29C 51/30 |
| 1171360 | 8/1985 | U.S.S.R. | B29C 65/50 |
| 87/01651 | 3/1987 | WIPO | B29C 67/18 |

*Primary Examiner*—Jeff H. Aftergut
*Assistant Examiner*—John T Harar
*Attorney, Agent, or Firm*—Bachman & LaPointe, P.C.

[57] ABSTRACT

An apparatus and process for attaching a protective thin film layer to a surface of a compact disc stamper are disclosed. An apparatus for carrying out the process comprises a base for supporting the compact disc stamper, a supply roll for providing the thin film protective layer to the compact disc stamper, and at least one bladder for inflating. The bladder is operative to be inflated against the protective layer for pressing the protective layer against the compact disc stamper. The apparatus may also include a mechanism for directing a vacuum induced suction force against the underside of the compact disc stamper for securing the same to the base while attaching the thin film protective layer to the compact disc stamper.

14 Claims, 5 Drawing Sheets

APPARATUS AND METHOD FOR PROTECTIVE LAYER APPLICATION

BACKGROUND OF THE INVENTION

This invention is related to devices for applying protective layers to surfaces, and more particularly, to a device for applying a thin film protective layer to a flat data surface of a compact disc stamper.

Compact discs have become the primary medium in which music and other audible art forms and the like are recorded due primarily to the sound quality achieved, the convenient size, and the ease of use associated therewith. Accordingly, millions of compact discs are manufactured every year to keep up with the demand for such high quality recordings.

In the manufacturing of compact discs, a laser etched master is typically first manufactured on a glass substrate. The master is typically used in forming a nickel stamper on the glass substrate. A nickel deposition is coated on the glass substrate through a nickel electro-forming process in order to produce a like data surface having a pit structure representative of the sound being recorded, called a stamper. The stamper is a negative of the desired data surface or pit structure of the compact disc, such that when copies are made, a true replication of the audio work is created.

Since the nickel data surface includes the important information for manufacturing compact disc replications, it is desirable to protect the data surface of the flat nickel stamper so that it is not damaged through other steps involved in manufacturing the stamper, such as, for example, punching, sanding, and inspection. Accordingly, a protective layer, sheet, or tape is typically applied to the nickel surface.

Currently known techniques for applying the protective layer to the nickel surface involve the manual application of the protective layer to the nickel surface and subsequently, the manual fitting of tape to or the trimming of excess tape from around the periphery of the stamper disc. While the manual process is effective, it is very slow and also very susceptible to human error and imperfections.

There exist's, therefore, a need for an automated apparatus and method for applying a protective layer or the like to a data surface of a compact disc stamper.

SUMMARY OF THE INVENTION

The primary object of this invention is to provide an apparatus and method for the automated application of a protective layer to a data surface.

Another object of this invention is to provide an apparatus and method for the automated application of a protective layer to the pit structure or data surface of a compact disc stamper.

Still another object of this invention is to provide an apparatus and method as aforesaid which uses a dual inflatable bladder for applying a protective layer to the data surface of a compact disc stamper.

And still another object of this invention is to provide an apparatus and method as aforesaid which automatically applies a protective layer to the data surface of a compact disc stamper and trims any excess portions of the protective layer away from the compact disc stamper, and which accomplishes this fully automatically without the necessity for manual handling.

And yet another object of this invention is to provide an apparatus and method as aforesaid for the automated application of a protective layer to a data surface of a compact disc stamper which uses vacuum induced suction for maintaining the stamper in place during the application of the protective layer.

The foregoing objects and advantages are obtained by the present invention which discloses an apparatus for attaching a protective layer to a surface of a compact disc stamper. The apparatus comprises means for supporting the compact disc stamper, means for providing a protective layer to the compact disc stamper, and means for inflating. The means for inflating is inflatable against the protective layer for forcing and bonding or sealing the protective layer against the surface. The means for inflating may be in the form of one or two or more inflatable bladders adapted to be inflated against the protective layer for pressing the protective layer against the compact disc stamper. The apparatus may further include means for securing the compact disc stamper to the means for supporting. In one embodiment, the means for securing preferably comprises means for applying vacuum induced suction to an under surface of the compact disc stamper.

A method for attaching a protective layer to a surface of a compact disc stamper includes the steps of placing the protective layer over the surface of the compact disc stamper and inflating at least one means for inflating against the protective layer and the surface for forcing the protective layer against the surface. The method may further include the steps of supporting the compact disc stamper on a turntable and securing the compact disc stamper to the turntable. In one embodiment the step of securing may be accomplished through applying a vacuum to an under surface of the compact disc stamper.

The details of the present invention are set out in the following description and drawings wherein like reference characters depict like elements.

DETAILED DESCRIPTION OF THE PREFERRED EMBODIMENT

Figure 1:
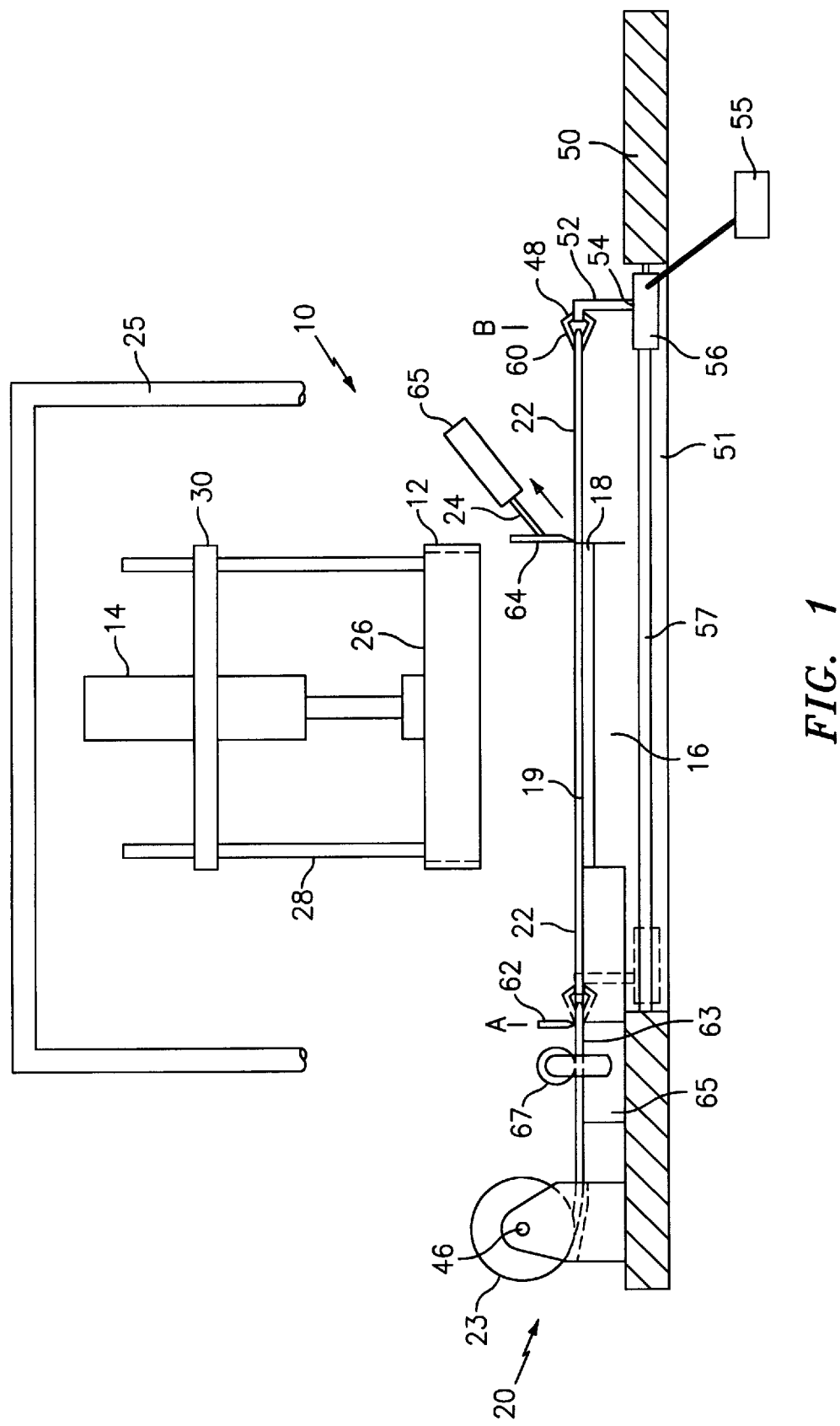
FIG. 1 is a front elevational and partially cross-sectional view of the apparatus of the present invention in the open position.

Referring row to the drawings in detail, there is shown in FIG. 1 an elevational view of an apparatus for applying a protective layer to a compact disc stamper, designated generally as 10. Apparatus 10 generally includes a housing 12 for enclosing a bladder (shown in FIG. 2), a piston/cylinder mechanism 14 for moving the housing 12 and bladder in a vertical direction, towards and away from a base 16 on which a compact disc stamper 18, having a data surface 19, is supported, a feeding mechanism 20 for providing a thin film protective layer 22 adjacent the surface of the compact disc stamper 18, and a cutter 24 for cutting excess amounts of the protective layer 22 away from compact disc stamper 18. The thin film protective layer is desirably a plastic layer having a thickness from 0.03–0.3 mm and preferably from 0.07–0.3 mm. The entire assembly is desirably covered with a hinged dome 25, shown partially in FIG. 1, which includes provision for air flow and a filter.

Figure 2:
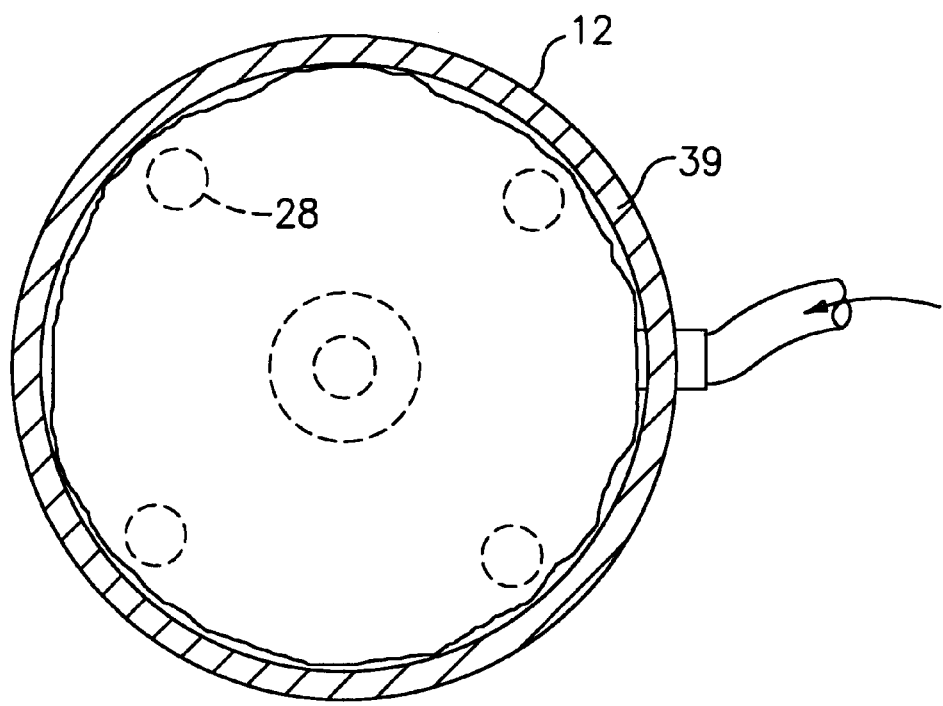
FIG. 2 is a bottom view of a housing portion of the present invention taken along line 2—2 of FIG. 3.

As shown in FIG. 2, housing 12 is preferably circular in shape and movable in the vertical direction preferably by piston cylinder mechanism 14 which is attached to upper surface 26 of housing 12. Housing 12 is preferably guided in the vertical direction by posts 28 equally spaced adjacent the periphery of housing 12 and extending upwardly from housing 12. In the preferred embodiment, three or four posts 28 are used, as indicated by the dotted lines in FIG. 2. Posts 28 may be guided in plate 30 under the power of piston/cylinder mechanism 14, as housing 12 is moved toward and away from, i.e., downwardly and upwardly, respectively, relative to base 16 and compact disc stamper 18.

Figure 3:
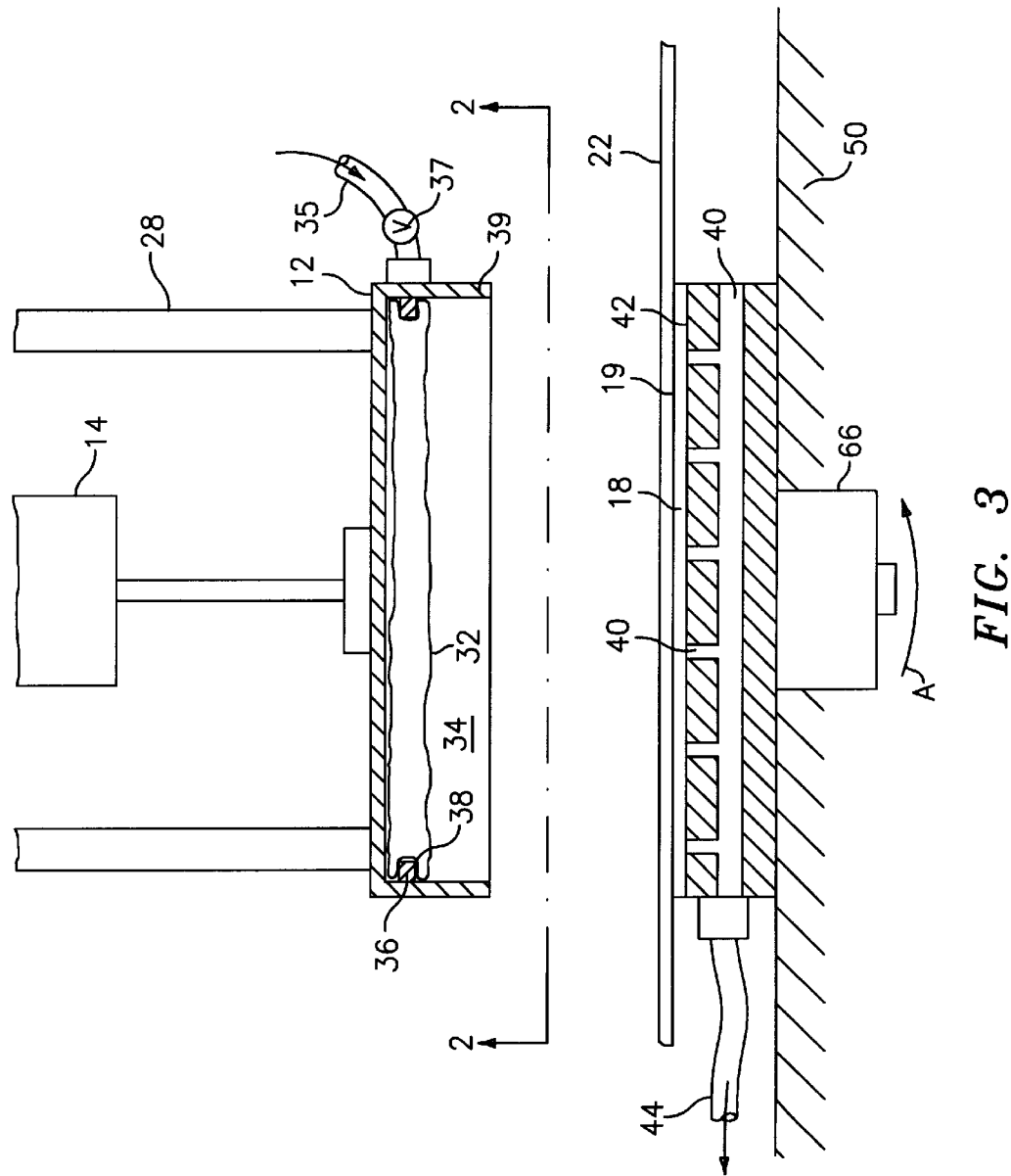
FIG. 3 is an enlarged and partially cross-sectional view of a protective layer application mechanism of the present invention shown in the open position and with a deflated bladder.
Figure 4:
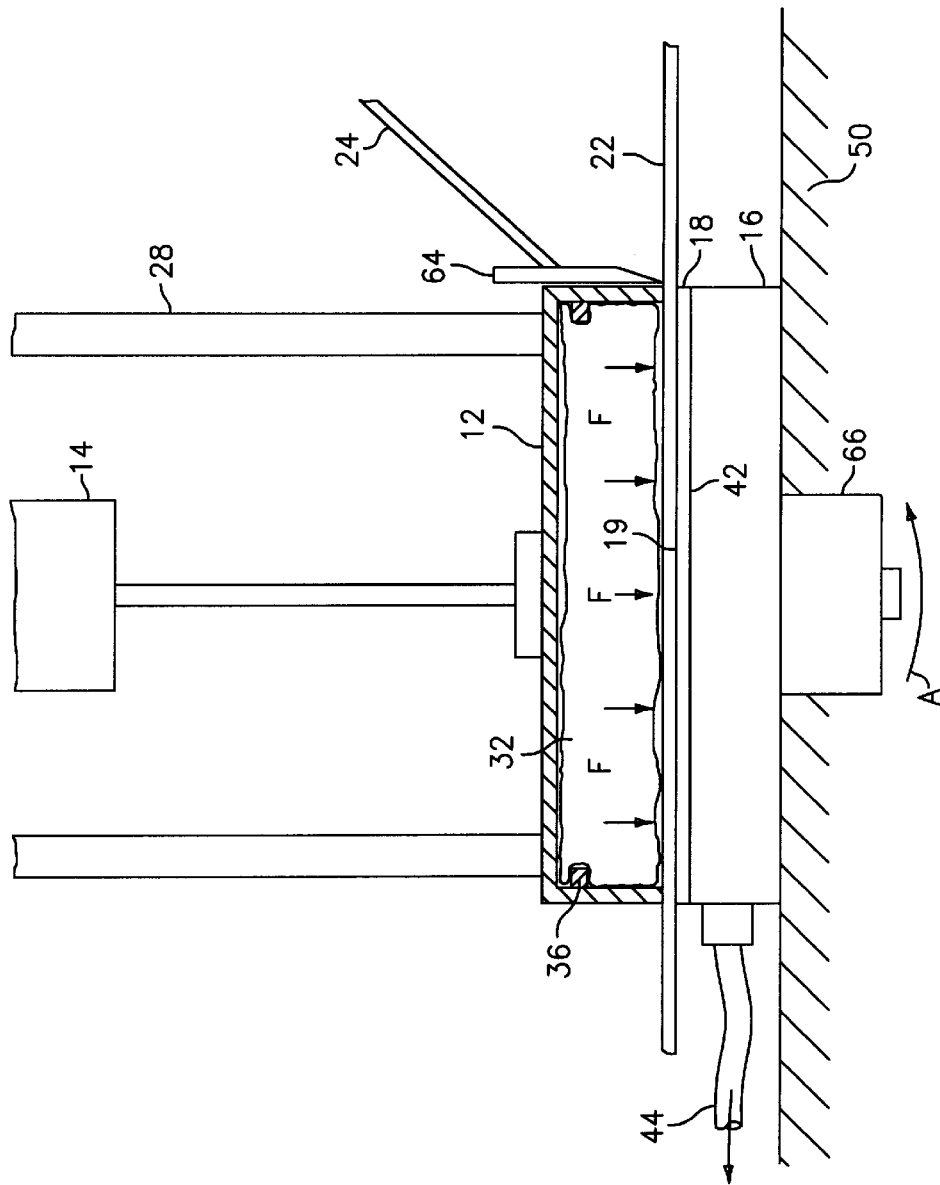
FIG. 4 is a view similar to FIG. 3 showing the protective layer application mechanism in the closed position with an inflated bladder.

With reference now to FIG. 3, housing 12 includes a bladder 32, which may desirably be a dual bladder, positioned within inner space 34 of housing 12. Preferably, pressurized air source 35 is provided in connection with bladder or bladders 32 for inflating the same, as shown in FIG. 4. Upon inflation, bladder 32 preferably inflates to the shape of housing 12, having a slightly greater depth for extending out of housing 12 and applying pressure to the compact disc stamper. Bladder 32 is preferably held in inner space 34 of housing 12 via ring 36 which extends around the periphery of bladder 32, at the top side thereof, and which is secured and preferably attachable to the upper inside surface 38 of housing 12, securing the bladder to the upper inside surface 38. Accordingly, when housing 12 is moved from the upper position shown in FIG. 3 to the lower position, as shown in FIG. 4, the preferably pre-inflated bladder 32 is pressed against protective layer 22 forcing it against compact disc stamper 18 on base 16. Also, wall 39 of housing 12 functions to secure the edges of protective layer 22 to compact disc stamper 18. The bladder 32 is responsible for forcing the protective layer 22 against stamper 18 and sealing the layer 22 to stamper 18. The bladder should be fully inflated through channel 35 connected to an air source (not shown) in order to seal tape layer 22 to the stamper properly. Valve assembly 37 is used to allow the bladder to vent the air contained within it properly so that air can be slowly released to allow the tape to seal properly.

Base 16 preferably has a similar peripheral shape as the shape of housing 12 and is of sufficient strength for supporting compact disc stamper 18 thereon under the pressure of bladder 32 while bladder 32 is in the inflated condition. Base 16 preferably includes a plurality of passages 40, extending therethrough and opening up at upper surface 42 of base 16. Suction is applied in passages 40, as shown in FIG. 3, via a vacuum source 44 so as to apply a suction force at upper surface 42 against compact disc stamper 18 for securing the same firmly on base 16. Accordingly, after compact disc stamper 18 is placed on base 16 and prior to the engagement of the inflated bladder 32 on protective layer 22 over compact disc stamper 18, suction is applied through passages 40 against the under surface of compact disc stamper 18.

Prior to the application of the pressing force from inflatable bladder 32, feed mechanism 20 automatically feeds protective layer 22, preferably in the form of an approx. 8 or 12 inch wide adhesive tape with a mild adhesive enabling the tape to be readily removed, to the upper surface of compact disc stamper 18. The feed mechanism comprises a tape roll 23 of protective layer or tape 22 being provided on a roller 46, desirably with a conventional clutch assembly, as shown in FIG. 1, as well as the use of linearly movable grippers 48, shown in FIGS. 1 and 5. Accordingly, protective layer or tape 22 is fed over the upper surface of compact disc stamper 18 with assistance from linearly movable grippers 48 pulling the protective layer or tape off of roller 46.

Figure 5:
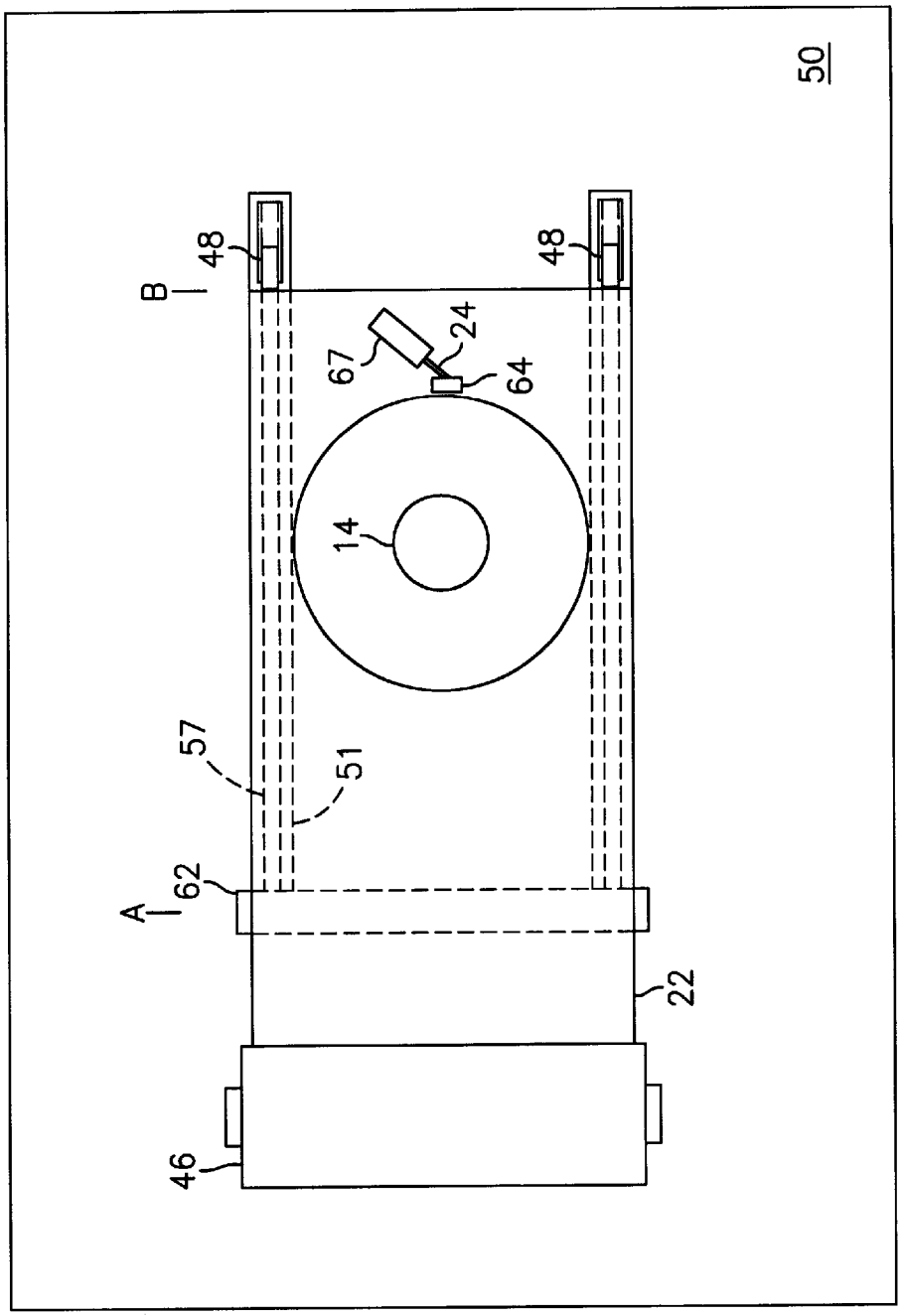
FIG. 5 is an over head view of the apparatus shown in FIG. 1.

Grippers 48, the specific design of which are known in the art, are preferably linearly slidable through support structure 50. Referring to FIGS. 1 and 5, support structure 50 includes longitudinal grooves 51 therein through which a portion 52 of grippers 48 extends. Referring to FIG. 1, a bottom end 54 of portion 52 is preferably attached to linear bearings 56 positioned on shafts 57 and movable in or under support structure 50 via transport mechanism 55, shown schematically. Accordingly, linear bearings 56 via transport mechanism 55 move grippers 48 through grooves 51 in support structure 50. Grippers 48 include a gripping head 60 adapted to engage the leading edge of protective tape or layer 22, firmly gripping the tape until the appropriate time to release same. Accordingly, grippers 48 are moved from point A, where it is shown in dotted lines in FIG. 1, where it grabs the leading edge of protective layer 22, to point B where protective layer 22 is extended across the data surface 19 of compact disc stamper 18.

A linearly advanceable upstream cutter 62 is preferably provided and positioned between feed mechanism 20 and base 16 upstream of base 16, as shown in FIGS. 1 and 5. Cutter 62 is operative to traverse the width of protective layer 22 for severing a section thereof from the roll of tape on roller 46 of feed mechanism 20. Cutter 62 cuts protective layer 22 against a support surface 63, desirably a chrome plated slitter bar that rises to the height of the cutter, mounted on block 65 after second roller 67 maintains protective layer 22 against block 65. This leaves the tape in position for the grippers to reach the next tape section. Cutter 62 is preferably operative after protective layer 22 is secured to compact disc stamper 18 via the inflation of bladder 32, as described above and discussed in more detail. Peripheral downstream rotary cutter 24 has a circular blade 64, as shown in FIGS. 1 and 4–5, which is used to trim the excess amount of protective layer 22 from the peripheral edge of compact disc stamper 18 for properly sizing the protective layer thereto. Cutter 24 is adapted to be moved into and out of position adjacent to the periphery of compact disc stamper 18. That is, blade 64 is preferably adjustable to different diameters as well as movable downwardly from a location above the support structure 50 via a piston/cylinder mechanism 67. Cutter 24 is operable to similarly retreat away from support structure 50 and base 16 upon completion of a cycle. A rotary drive 66, as shown in FIGS. 3 and 4, is preferably connected with base 16, which is desirably in the form of a turntable, and is operable to rotate base 16 along its center axis, as indicated by the arrow A, relative stationary cutter 24, once the protective layer is applied to stamper 18 and housing 12 is moved back to the open position shown in FIG. 3. Vacuum source 44 is maintained for holding compact disc stamper 18 to turntable 16. Accordingly, while turntable 16 is rotating and the peripheral edge of compact disc stamper 18 is rotating relative blade 64, blade 64 is preferably extensible into position for trimming excess portions of protective layer 22 from the periphery of compact disc stamper 18. Once trimming is complete, a new compact disc stamper can be provided onto base turntable 16.

In operation, and referring to FIGS. 1–5, a compact disc stamper 18 having data surface 19 facing upwardly is placed on turntable 16. Vacuum source 44 is then preferably activated for providing a suction force against the under surface of compact disc stamper 18 and thereby securing the same to base 16. Grippers 48 are moved in grooves 51 via linear bearings 56 and a suitable and conventional transport mechanism 55, shown schematically, for gripping the leading edge of protective layer or tape 22. Gripping heads 60 are activated to engage the leading edge and transport mechanism 55 is again activated to move linear bearings 56 along with grippers 4E from position A to position B, drawing protective layer 22 over the data surface 19 of compact disc stamper 18. Once position B is reached, gripping heads 60 remain engaged with protective layer 22 and housing 12 is moved downwardly via piston/cylinder mechanism 14 toward compact disc stamper 18 and turntable 16. Housing 12 is moved against protective layer 22 and bladder 32 is inflated, as shown in FIG. 3.

Bladder 32 is inflated preferably via a pressurized air source through line 35 filling bladder 32 with air, and accordingly filling inner space 34 of housing 12 with bladder 32. As bladder 32 fully inflates, the lower surface thereof extends slightly out of housing 12, creating pressing forces F which are applied against protective layer or tape 22 and compact disc stamper 18, as shown in FIG. 4, to adhere the same to compact disc stamper 18. Bladder 32 is preferably designed to apply force to the entire surface of compact disc stamper 18, while wall 39 of housing 12 applies a force to the edges of layer 22, thereby securing protective layer 22 to the entire surface of compact disc stamper 18. Once bladder 32 has been fully inflated and protective layer 22 firmly applied to compact disc stamper 18, housing 12 retreats from the closed or down position of FIG. 4 to the open or up position of FIG. 3, and the bladder 32 is gradually deflated, desirably at a desired flow rate. At this point, the vacuum source remains on and the heads 60 of grippers are disengaged from the leading edge of protective layer 22.

Linear cutter 62 is then activated to separate the applied protective layer 22 from the protective layer on roller 46, providing another leading edge for gripping by grippers 48 for repeating the above described operation. Base 16 is then rotated via rotary drive 66 and blade 64 of cutter 24 is preferably moved into position from above turntable 16, functioning to trim excess protective layer 22 from the periphery of compact disc stamper 18. Once the excess is trimmed, compact disc stamper 18 may be removed with a closely fit protective layer attached to data surface 19 thereof.

The primary advantage of this invention is that an apparatus and method are provided for the automated application of a thin film protective layer to a flat data surface. Another advantage of this invention is that an apparatus and method are provided for the automated application of a thin film protective layer over the pit structure or flat data surface of a compact disc stamper. Still another advantage of this invention is that an apparatus and method are provided which may desirably use multiple inflatable bladders for applying a thin film protective layer over the data surface or pit structure of a compact disc stamper, with controlled pressure and venting and with the use of air and vacuum. And still another advantage of this invention is that an apparatus and method are provided which automatically applies a thin film protective layer to the data surface or pit structure of a compact disc stamper and trims any excess portions of the protective layer away from the compact disc stamper, allowing diametric trimmer choice. And yet another advantage of this invention is that an apparatus and method are provided for the automated application of a thin film protective layer to a data surface of a compact disc stamper which uses suction or vacuum for maintaining the stamper in place during the application of the thin film protective layer.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. An apparatus for attaching a thin film protective layer to a flat data surface of a compact disc stamper, comprising:

a compact disc stamper including a flat data surface thereon and means for supporting said compact disc stamper, including means for securing said compact disc stamper to said means for supporting;

a thin film protective layer for the data surface of said compact disc stamper and means for providing said thin film protective layer to the flat data surface of said compact disc stamper, including means for fitting said thin film protective layer to said compact disc stamper, wherein said compact disc stamper has a peripheral edge and said means for fitting comprises a cutter adapted to be positioned adjacent said peripheral edge for cutting said thin film protective layer adjacent to said peripheral edge;

wherein said means for supporting is rotatable along an axis such that said peripheral edge of said compact disc stamper moves relative to said cutter causing said cutter to cut said protective layer; and means for inflating, wherein said means for inflating is inflatable against said thin film protective layer for forcing and bonding said protective layer against said surface.

2. The apparatus according to claim 1, including a cover means over said apparatus to provide a closed environment for said apparatus.

3. Apparatus according to claim 1, wherein said protective layer has a thickness from 0.03–0.3 mm.

4. The apparatus according to claim 3, wherein said means for inflating comprises at least one inflatable bladder adapted to be inflated against said thin film protective layer for pressing said thin film protective layer against said compact disc stamper.

5. The apparatus according to claim 4, further comprising a supported housing which encloses said bladder.

6. The apparatus according to claim 5, wherein said at least one bladder is sized to fill said housing upon inflation while also pushing against said thin film protective layer and compact disc stamper.

7. The apparatus according to claim 5, further comprising means for moving at least a portion of said housing toward and away from said compact disc stamper on said means for supporting.

8. The apparatus according to claim 7, wherein said means for moving comprises a piston/cylinder mechanism.

9. The apparatus according to claim 7, including an outside wall of said housing operative to secure the protective layer to said stamper.

10. The apparatus according to claim 1, wherein said means for feeding comprises means for gripping said thin film protective layer and pulling said thin film protective layer across said surface.

11. The apparatus according to claim 10, wherein said means for gripping comprises at least one linearly movable gripper.

12. The apparatus according to claim 10, including a cutter upstream of said stamper for severing said protective layer from a roll of said protective layer.

13. The apparatus according to claim 1, wherein said means for securing comprises means for applying vacuum to an under surface of said compact disc stamper for securing said compact disc stamper on said means for supporting.

14. The apparatus according to claim 13, wherein said means for supporting comprises a base with passages therethrough and adapted to open into a location adjacent said under surface of said compact disc stamper, said means for applying vacuum comprising a vacuum source adapted to be applied in said passages and against said under surface of said compact disc stamper.

* * * * *